United States Patent [19]

Matsubara et al.

[11] Patent Number: 4,789,272

[45] Date of Patent: Dec. 6, 1988

[54] TRANSPORTATION METHOD OF SYNTHETIC RUBBER CHIPS

[75] Inventors: Tetsuyuki Matsubara, Yokohama; Norifumi Ito, Kamakura; Mune Iwamoto; Toshihiko Ando, both of Yokohama, all of Japan

[73] Assignees: Mitsui Toatsu Chemicals, Incorporated; Toyo Engineering Corporation, both of Tokyo, Japan

[21] Appl. No.: 26,937

[22] Filed: Mar. 17, 1987

[30] Foreign Application Priority Data

Mar. 25, 1986 [JP] Japan ................................. 61-64947

[51] Int. Cl.[4] ............................................. B65G 53/00
[52] U.S. Cl. .................................... 406/48; 406/197; 241/DIG. 31; 528/499
[58] Field of Search ................ 406/46, 48, 197; 241/DIG. 31; 198/500; 528/483, 499

[56] References Cited

U.S. PATENT DOCUMENTS

| | | | |
|---|---|---|---|
| 1,880,372 | 10/1932 | Bull | 241/DIG. 31 |
| 2,827,505 | 3/1958 | Parrell et al. | 241/DIG. 31 |
| 3,809,436 | 5/1974 | Ciaffone | 406/48 |
| 4,625,922 | 12/1986 | Brubaker et al. | 241/DIG. 31 X |
| 4,714,756 | 12/1987 | Buckmaster | 528/499 X |

Primary Examiner—Sherman D. Basinger
Assistant Examiner—Paul E. Salmon
Attorney, Agent, or Firm—Flynn, Thiel, Boutell & Tanis

[57] ABSTRACT

Upon transportation of synthetic rubber chips through a piping or by means of a conveyor, 2 wt. %–50 wt. % based on the weight of the synthetic rubber chips of steam of 160° C. or lower, water or both steam of 160° C. or lower and water is added to the synthetic rubber chips upon their transportation.

6 Claims, 1 Drawing Sheet

TRANSPORTATION METHOD OF SYNTHETIC RUBBER CHIPS

BACKGROUND OF THE INVENTION

1. Field of the Invention

This invention relates to an improved method for the transportation of chips of synthetic rubber.

2. Description of the Prior Art

Synthetic rubber such as polybutadiene and butadiene-containing copolymer rubber is used widely as a modifier for making improvements in the impact strength and like properties of resins.

Synthetic rubber is generally available in the form of blocks in bales on the market. For the above-mentioned application, it is a routine practice to chop synthetic rubber blocks into small chips by means of a rubber chopper. Thereafter, the chips are dissolved in a monomer or the like and the resultant solution is then subjected to a polymerization reaction. In the case of high impact polystyrene for example, a butadiene-containing homo- or co-polymer rubber block is chopped into chips by means of a rubber chopper and the chips are then dissolved in a styrene monomer to prepare a rubber solution in the styrene monomer. A high impact polystyrene resin with improved impact strength can then be obtained by polymerizing the rubber solution.

Upon dissolution of synthetic rubber chips in a monomer or the like, the chips of the synthetic rubber which have been discharged from a rubber chopper or the like are usually transported in a continuous operation by air transportation or by a belt conveyor, followed by their addition to a monomer stored in a mixing tank or the like.

Since the synthetic rubber is very sticky, the chips of the synthetic rubber tend to stick on the piping or belt conveyor in the course of their transportation. When the operation is continued without removal of the thus-stuck chips, more and more chips may then be caused to stick so that the operation cannot be continued any longer. Moreover, a great deal of labor and time is required for the removal of the so-stuck synthetic rubber chips.

Various attempts have heretofore been made with a view toward reducing the sticking problem of such synthetic rubber chips in the course of their transportation.

It has been proposed, for example, to add powder such as talc or stearic acid to synthetic rubber chips. Although this method is effective in reducing the sticking of synthetic rubber chips, it is accompanied by a drawback that the powder remains as an impurity in the final product.

It has also been known to mirror-finish a conveyor, piping or the like or to coat it with TEFLON ® (as-trade name for polytetrafluoroethylene). In the case of mirror-finishing, its effect is not very remarkable. TEFLON ® coating is certainly effective in reducing the sticking problem but is accompanied with a danger that occurrence of static electricity is induced.

SUMMARY OF THE INVENTION

An object of this invention is to minimize the sticking of synthetic rubber chips on a piping or conveyor in the course of their transporation and hence to avoid the need for removal of stuck chips and cleaning of the piping or conveyor.

Another object of this invention is to avoid the need for the addition of a sticking-preventive impurity to synthetic rubber chips upon their transporation and also to prevent occurrence of static electricity so that the danger of explosion is eliminated upon charging synthetic rubber chips into an organic solvent subsequently.

In one aspect of this invention, there is thus provided a method for the transportation of synthetic rubber chips through a piping or by means of a conveyor, which comprises adding to the synthetic rubber chips steam of 160° C. or lower, water or both steam of 160° C. or lower and water in an amount of 2 wt. %–50 wt. % based on the weight of the synthetic rubber chips upon transportation of the synthetic rubber chips. When both steam of 160° C. or lower and water are added, it is preferable to add them simultaneously. The synthetic rubber chips may preferably be transported through a pneumatic piping.

DETAILED DESCRIPTION OF THE PREFERRED EMBODIMENTS

Figure 1:
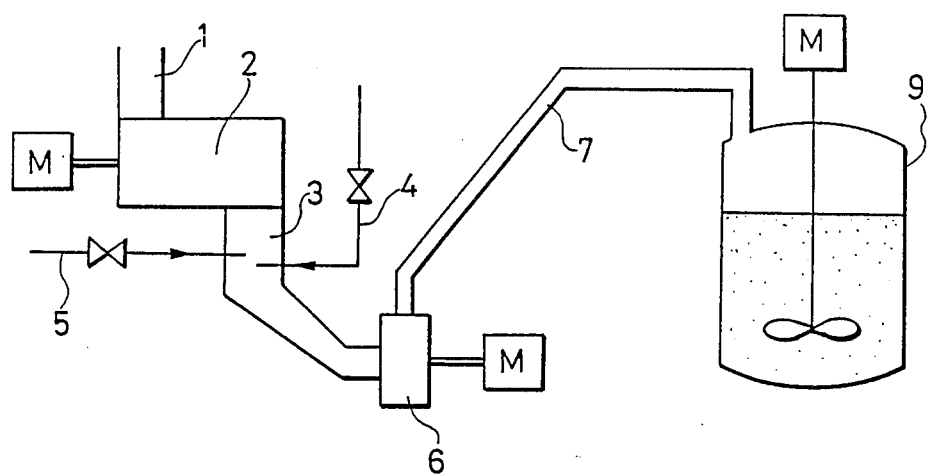
FIG. 1 is a schematic illustration of an embodiment of the present invention wherein the rubber chips are transported pneumatically.

The term "synthetic rubber" as used herein means those obtained by polymerizing monomers typified by butadiene. Illustrative examples of the synthetic rubber may therefore include polybutadiene rubber, copolymerized styrene-butadiene rubber, copolymerized acrylonitrile-butadiene rubber, copolymerized ethylenepropylene rubber, copolymerized ethylene-propylenediene rubber, chloroprene rubber, etc.

These rubber products are usually available in blocks on the market. When dissolving such rubber in a monomer or the like, it is preferable to chop them from the viewpoint of the easiness of their dissolution. They are hence employed subsequent to their chopping into chips by means of a rubber chopper.

When transporting the thus-chopped synthetic rubber in the form of chips, the temperature of steam to be added to the synthetic rubber chips may preferably be 160° C. or lower, more preferably, 150° C. or lower. It is not preferable to use high-temperature steam hotter than 160° C., because the synthetic rubber may be deteriorated by the heat. Water may be added in lieu of steam. When water is employed, it is necessary to mix water evenly with the synthetic rubber chips. As a further alternative, both steam and water may also be added either simultaneously or separately.

Upon addition of steam and/or water, it is essential to control the amount of the steam and/or water within a range of 2 wt. %–50 wt. %, preferably, 5 wt. %–40 wt. % based on the weight of the synthetic rubber chips to be transported. If the amount of the steam and/or water is less than 2 wt. %, it is impossible to bring about, to an appreciable extent, the sticking-preventive effect for the synthetic rubber chips. Any amounts greater than 50 wt. % cannot however bring about any additional effects. On the contrary, the water content in the system becomes too high and some adverse effects may occur in some instances.

The thus-added water will not mix as an impurity in a product to be produced from the synthetic rubber chips. So long as the water content is controlled within the above-mentioned suitable range, no adverse effects will be given to a subsequent reaction such as polymerization.

In order to transport the above-chopped synthetic rubber chips, the air transporation method may be followed to transport the synthetic rubber chips pneumatically through a piping by an air blower. As an alternative, they may also be conveyed on a conveyor such as belt conveyor. It has been known that the sticking problem of the synthetic rubber chips can be reduced if walls, which are brought into contact with the synthetic rubber chips, are coated with TEFLON ®. The effects of the present invention can also be enhanced by such TEFLON ® coating. Synthetic rubber is highly susceptible of developing static electricity in general, and this tendency is promoted further when TEFLON ® coating is applied. There is thus a danger of explosion, for example, when synthetic rubber chips are charged into an organic solvent. A special care must hence be taken upon their handling. Unlike such prior art transportation methods, the method of this invention is free of the danger of explosion upon charging synthetic rubber chips into an organic solvent even when TEFLON ® coating is applied, because owing to the addition of steam and/or water, the relative humidity of the synthetic rubber chips is very high.

According to the method of this invention, the sticking problem of synthetic rubber chips on a piping, conveyor or the like upon their transportation can be reduced without the problem of introduction of an impurity in the final product. It is hence possible to reduce to a significant extent the labor which is required for the removal of stuck synthetic rubber chips. It is also possible to obviate the danger of explosion which may occur when synthetic rubber chips are charged into an organic solvent or the like.

The present invention will hereinafter be described in further detail by the following Examples. It should however be borne in mind that this invention is not limited to or by the following Examples.

EXAMPLE 1

Blocks of polybutadiene rubber "DIENE 55AS" (trade name; product of Asahi Chemical Industry Co., Ltd.) in 35 kg bales were continuously chopped into chips at a rate of 1000 kg/hour by a rubber chopper manufactured by RIETZ Company. Chips of the thus-chopped rubber were transported pneumatically and continuously through a stainless steel piping of 4 inches in diameter by means of an air blower. The chips were charged into a rubber-dissolving tank in FIG. 1 shows an embodiment of the air transportation method. Synthetic rubber is fed in blocks into the rubber block inlet 1 of a rubber chopper 2. The rubber chopper 2 reduces the size of the rubber blocks to chips and the rubber chips are discharged from the rubber chopper 2 through the rubber chip outlet 3. A water inlet 4 and a steam inlet 5 are provided in the rubber chip outlet 3 in order to introduce water and/or steam into the discharge of rubber chips from the rubber chopper 2. The rubber chips together with water and/or steam is fed to a rubber chip transportation blower 5 which propels the rubber chips, water and/or steam through piping 7 into a rubber-dissolving tank 9 where the rubber is further processed.

Figure 2:
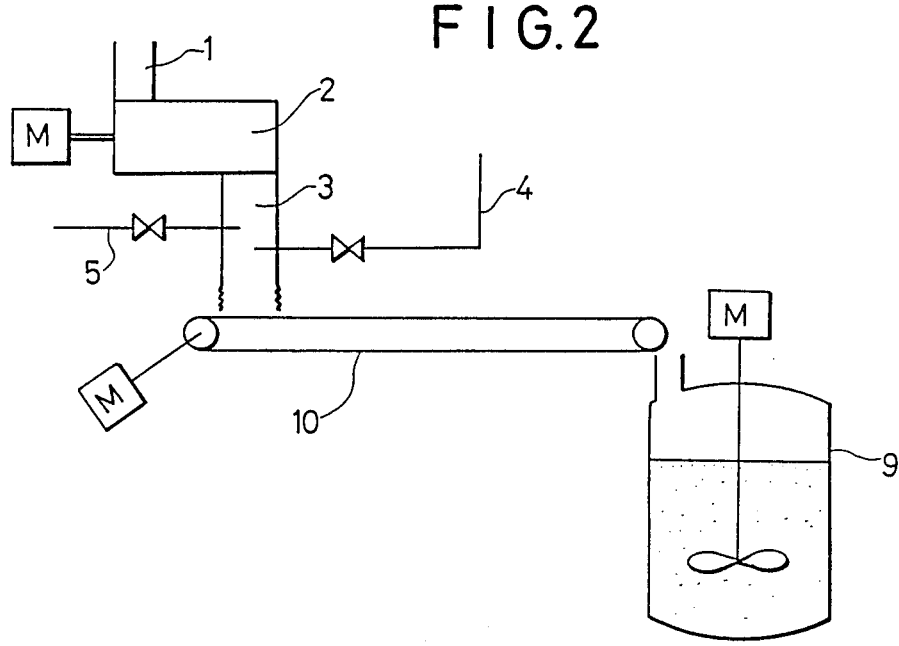
FIG. 2 is a schematic illustration of a second embodiment of the present invention wherein the rubber chips are transported by a conveyor.

FIG. 2 shows an embodiment of the conveyor transportation method wherein synthetic rubber blocks are introduced into the rubber block inlet 1 of a rubber chopper 2. The rubber chopper 2 reduces the size of the rubber blocks to chips and the rubber chips are then discharged through the rubber chip outlet 3. A water inlet 4 and steam inlet are provided in the rubber chip outlet 3 in order to introduce water and/or steam into the discharge of rubber chips from the rubber chopper 2. The rubber chips are discharged out of the rubber chip outlet 3 onto a belt conveyor 10 which transports the rubber chips to a rubber-dissolving tank 9 where the rubber is further processed.

The present invention will hereinafter be described in further detail by the following Examples. It should however by borne in mind that this invention is not limited to or by the following Examples.

EXAMPLE 1

Blocks of polybutadiene rubber "DIENE 55AS" (trade name; product of Asahi Chemical Industry Co., Ltd.) in 35 kg bales were continuously chopped into chips at a rate of 1000 kg/hour by a rubber chopper manufactured by RIETZ company. Chips of the thus-chopped rubber were transported pneumatically and continuously through a stainless steel piping of 4 inches in diameter by means of an air blower. The chips were charged into a rubber-dissolving tank in which monomeric styrene had already been charged and was under stirring. Upon transportation of the chips, steam of 2 $kg/cm^2G$ (about 130° C.) and purified water were simultaneously and continuously charged, each, at a flow rate of 100 kg/hour through the intake port of the air blower. The sticking of the rubber chips in the air blower and piping was reduced compared with a comparative operation conducted without the addition of steam or water. As a result, it was able to prolong to 3 weeks the interval of cleaning operations for the removal of stuck rubber chips. Incidentally, the comparative operation will be described below as Comparative Example 1. The relative humidity was 100% at the exit of the piping. The chopped rubber was dissolved in styrene, followed by polymerization into high impact polystyrene. No differences were observed in the reaction and the like compared with the similar operation conducted without the addition of steam or water.

COMPARATIVE EXAMPLE 1

An operation was conducted in the same manner as in Example 1 except for the omission of steam and purified water. Considerable sticking of rubber chips took place in the air blower and piping so that they had to be cleaned for the removal of stuck rubber chips as early as the third day after initiation of the operation.

EXAMPLE 2

An operation was conducted in the same manner as in Example 1 except that the inner wall of the transportation pipeline had been coated with TEFLON. The sticking of rubber chips was reduced further compared with Example 1. Cleaning was needed only once in 2 months.

EXAMPLE 3

Rubber chips, which had been chopped in the same manner as in Example 1, were transported by means of a vibrating belt conveyor and were then charged into the rubber-dissolving tank. At that time, purified water of 2 kg/cm²G was sprayed at a rate of 200 kg/hour to the outlet of the rubber chopper. Compared with Comparative Example 2 which will be given next, the sticking of rubber chips was reduced and cleaning was needed only once a month.

COMPARATIVE EXAMPLE 2

An operation was conducted in the same manner as in Example 1 except for the omission of purified water. Considerable sticking of rubber chips took place especially on metal surfaces. Cleaning was required on every 5th day.

We claim:

1. In a method for the transporation of chips consisting of synthetic rubber through a piping or by means of a conveyor, the improvement comprising conducting said transportation of synthetic rubber chips through said piping or by means of said conveyor by simultaneously adding steam at 160° C. or lower and water in a total amount of 2 wt. %–50 wt. %, based on the weight of the synthetic rubber chips, wherein tackiness of the synthetic rubber chips is reduced during said transportation.

2. The method as claimed in claim 1, wherein the synthetic rubber chips are transported through said piping pneumatically.

3. The method as claimed in claim 1, wherein inside surfaces the piping or the conveyor, which are brought into contact with the synthetic rubber chips, are coated with polytetrafluoroethylene.

4. The method as claimed in claim 1, wherein the synthetic rubber is selected from the group consisting of polybutadiene rubber, copolylmerized styrene-butadiene rubber, copolymerized acrylonitrile-butadiene rubber, copolymerized ethylene-propylene rubber, copolymerized ethylene-propylene-diene rubber and chloropene rubber.

5. A method as claimed in claim 1, in which said chips are transported in a continuous manner and, during which, water and steam are continuously added so as to be deposited on said chips.

6. A method as claimed in claim 5, in which a block of said synthetic rubber is subdivided by a chopper to form said synthetic rubber chips and said chips are transported in said continuous manner into a synthetic rubber dissolving apparatus.

* * * * *

UNITED STATES PATENT AND TRADEMARK OFFICE
CERTIFICATE OF CORRECTION

PATENT NO. : 4 789 272
DATED : December 6, 1988
INVENTOR(S) : Tetsuyuki MATSUBARA et al It is certified that error appears in the above-identified patent and that said Letters Patent is hereby corrected as shown below:

Column 6, line 5; after "surfaces" insert ---of---.

Signed and Sealed this

Twenty-fifth Day of July, 1989

Attest:

DONALD J. QUIGG

Attesting Officer

Commissioner of Patents and Trademarks